July 9, 1963

A. D. GOETTL 3,096,703

LOUVER STRUCTURE

Filed Dec. 12, 1960

INVENTOR.
ADAM D. GOETTL

BY Wm. H. Dean

July 9, 1963      A. D. GOETTL      3,096,703
LOUVER STRUCTURE
Filed Dec. 12, 1960      2 Sheets-Sheet 2
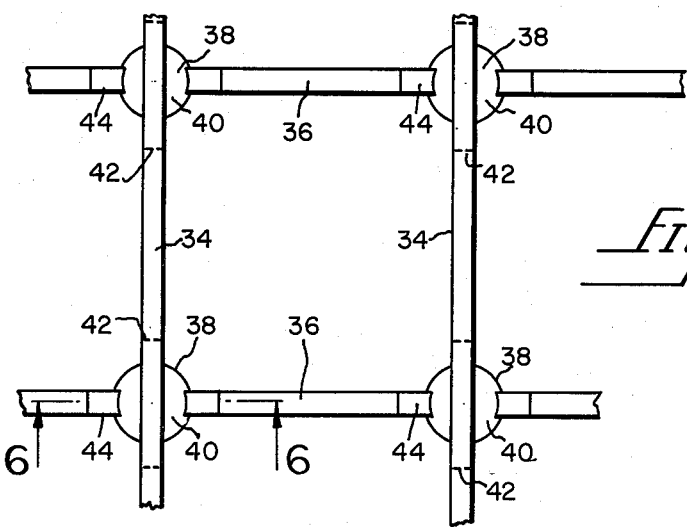
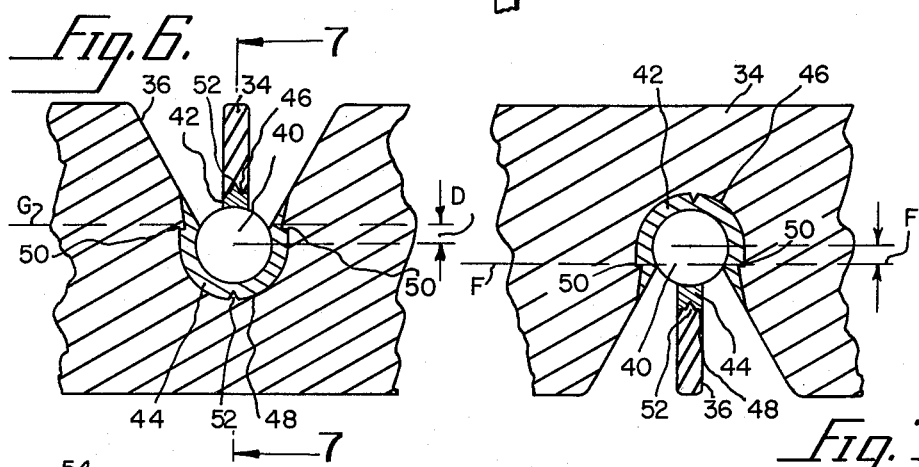
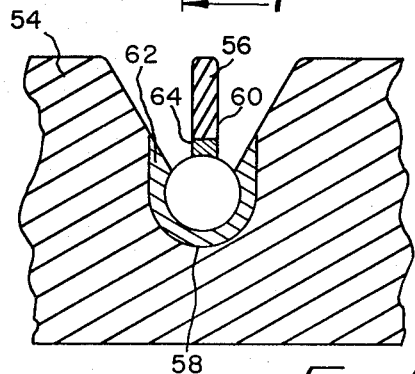
INVENTOR.
ADAM D. GOETTL
BY Wm. H. Dean

United States Patent Office 3,096,703
Patented July 9, 1963

3,096,703
LOUVER STRUCTURE
Adam D. Goettl, Phoenix, Ariz., assignor to McGraw-Edison Company, Milwaukee, Wis., a corporation of Delaware
Filed Dec. 12, 1960, Ser. No. 75,214
6 Claims. (Cl. 98—110)

This invention relates to a louver structure and more particularly to a louver structure comprising sets of pivotally interconnecting angularly intersecting slats wherein universal joint bearing assemblies are inserted in notches in the slats to provide pivotal interconnection of the sets of slats at their angularly intersecting portions.

The present application discloses a louver structure which is an improvement over the louver structure disclosed in my issued Patent No. 2,892,395.

Additionally, bearing assemblies in accordance with the method disclosed is claimed in my issued Patent 2,931,066.

It has been recognized that bearing assemblies of a universal joint type may be cast in accordance with the teachings of my former Patent 2,931,066 and such universal joint assemblies may be inserted into notches in angularly intersecting slats.

This facility permits the assembly of various types of slats made of various materials and in various proportions all of which may utilize a common universal joint assembly.

Accordingly, it is an object of the present invention to provide a louver structure comprising a universal joint assembly which includes insert members universally connected together and disposed at an angle to each other whereby these insert members may be secured or disposed in notches in intersecting slats to permit pivotal interconnection thereof.

Another object of the invention is to provide a louver structure wherein universal joint assemblies of cast construction may readily be inserted in notches of intersecting slats so that slats of varying proportions may be readily interconnected without the necessity of casting the entire slats.

Another object of the invention is to provide a louver structure wherein universal joint assemblies may be cast and then inserted in notches in the edges of slats which might normally be difficult to cast in one assembly according to my former Patent 2,931,066.

Another object of the invention is to provide a louver structure wherein universal joint assemblies may be cast or constructed in various ways and may be utilized to interconnect and pivotally support intersecting slats made of various materials which may either be cast or must be prepared in various ways as, for example, either metal, plastic or wooden slats may be pivotally interconnected by the universal joint assembly of the invention if desired.

Another object of the invention is to provide a novel structure wherein a universal joint assembly comprises a spherical member having substantially U-shaped insert members which engage the spherical member for a distance exceeding 180 degrees around the periphery thereof whereby the shoes may be fixed in notches in intersecting slats in order pivotally to interconnect these slats.

A further object of the invention is to provide a louver structure wherein universal joint assemblies may be cast of plastic or metal in accordance with the teachings of my former Patent 2,931,066 and whereby these assemblies may be cast of plastic or metal and readily adapted for insertion into a great variety of slat structures made of a great variety of materials and sizes.

Other objects and advantages of the invention may be apparent from the following specification, appended claims and accompanying drawings in which:

FIG. 5 is a view similar to FIG. 1 showing a modification of the present invention.

FIG. 6 is a fragmentary sectional view taken from the line 6—6 of FIG. 5.

FIG. 7 is a fragmentary sectional view taken from the line 7—7 of FIG. 6.

FIG. 8 is a fragmentary sectional view of a modified form of the invention taken substantially on the same plane as that shown in FIG. 6 of the drawing.

Figure 1:
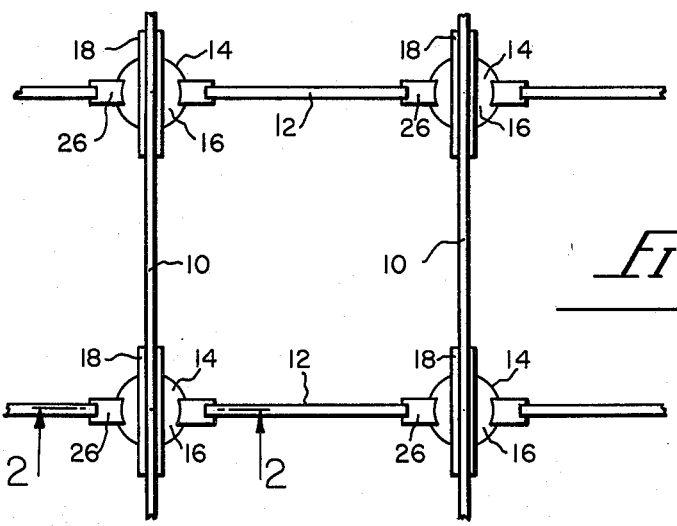
FIG. 1 is a fragmentary side elevational view of an assembly of angularly intersecting slats interconnected by universal joint assemblies in accordance with the present invention.

As shown in FIG. 1 of the drawings, the louver structure of the invention comprises a plurality of parallel slats 10 which may be made of sheet metal or the like and these slats 10 intersect similar slats 12 at substantially right angles.

At the intersections of the slats 10 and 12 are universal joint assemblies 14 which pivotally interconnect the slats 10 and 12 at their intersection areas.

Figures 2, 3:
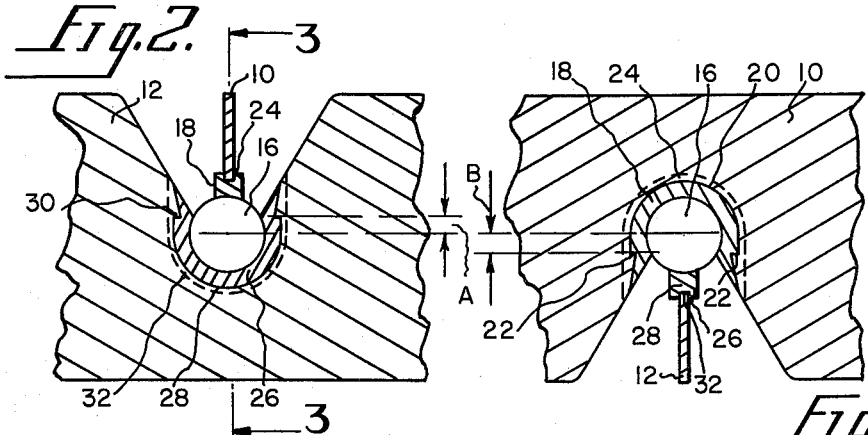
FIG. 2 is an enlarged fragmentary sectional view taken from the line 2—2 of FIG. 1.
FIG. 3 is a fragmentary sectional view taken from the line 3—3 of FIG. 2.

With reference to FIGS. 2 and 3 of the drawings it will be seen that each universal joint assembly 14 comprises a spherical member 16. Coplanar with the slats 10 are substantially U-shaped inserts 18 which are disposed in notches 20 of each of the slats 10. These notches 20 are substantially conforming notches and comprise buttress shaped barbs 22 which hold the inserts in the notches 20 as will be hereinafter described. Each buttress-shaped barb 22 is preferably an integral portion of the slats 12 terminating in an inwardly directed ledge which extends inwardly toward the respective notch 28, said buttress having an inclined portion 29 terminating in the inwardly directed buttress ledge, said inclined portion being inwardly directed with respect to a comparable buttress structure at the opposite side of each notch, as shown in FIGS. 2 and 3 of the drawings, whereby these inclined portions 29 converge inwardly with respect to each other and the notch into which they are directed.

Figure 9:
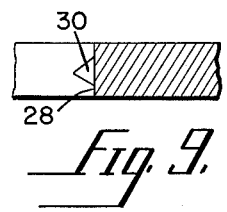
FIG. 9 is a fragmentary sectional view taken from the line 9—9 of FIG. 4, showing structure of a slat only, of the invention.

As shown in FIGS. 6, 7 and 9 of the drawings, the buttress portions 30 are triangular in cross section and project into the respective notch 28.

Figure 4:
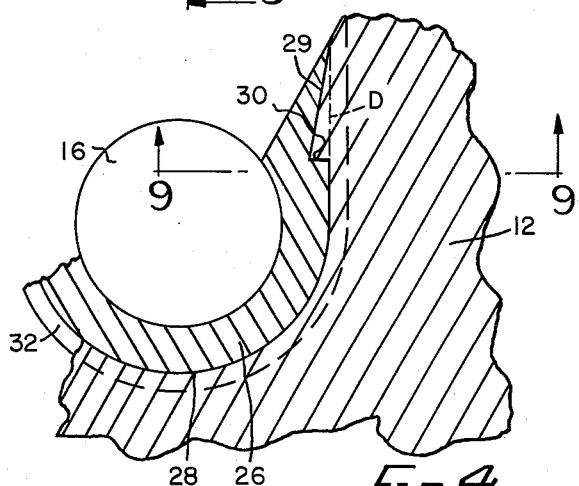
FIG. 4 is an enlarged fragmentary sectional view taken on substantially the same plane as that shown in FIG. 2.

As indicated by a broken line D, in FIG. 4 of the drawings, the inclined portion 29 is inclined inwardly toward the respective insert 26. It will be seen that the line D is substantially coincident with an extremity of the insert 26 and that the inclined portion 29 of each buttress barb 30 is at an acute angle relative thereto and terminates in a ledge or barb portion which extends inwardly of the respective notch. These inserts 18 are preferably made of plastic or other material which is substantially softer than the material of the buttress shaped barbs 22 so that when the inserts 18 are positioned in the notches 20 the barbs 22 will be embedded in the outer portions of the inserts 18. Thus, the inserts 18 will be retained in the notches 20.

The outer surface of each insert 20 is provided with an arcuate recess or channel portion 24 which retains the edge of the respective slat 10 as shown best in FIG. 2 of the drawings.

As indicated by lines A and B shown in FIG. 3 of the drawings, the insert extends around the spherical bearing member 16 a distance in excess of 180 degrees thus the insert 18 as shown in FIG. 3 when forced into the notch 20 securely grips the spherical bearing member 16 and prevents its removal from the insert 18.

It will be understood that the insert 18 is cast on the spherical bearing member 16 in accordance with the teachings of my former Patent 2,931,066. Additionally, these inserts 18 may be formed separately if desired and sprung into gripping relationship with the spherical bearing member 16 when the insert 18 is forced into the notch 20.

Engaging each bearing member 16 is a second insert 26 which is identical in construction to the insert 18. The insert 18 being engaged with a respective slat 10 while the insert 26 is engaged with a respective slat 12.

It will be understood that each of the inserts at its engagement with each respective bearing 16 is arcuately conforming so that when such inserts are retained in the corresponding notches of the slats that the inserts 18 and 26 may not be moved from the bearing member 16 laterally of the respective connected slat.

As shown in FIG. 2 of the drawings, each insert 26 is disposed in a notch 28 of each slat 12 in a similar manner to the disposition of the insert 18 in each notch 20 of each slat 10 as hereinbefore described in connection with the disclosure of FIG. 3.

FIG. 4 is an enlarged view particularly disposed to disclose the buttress barb portions 30 of each insert 26. Said barb portions 30 being substantially identical to the barb portions 22 described in connection with the insert 18. An arcuate recess 32 of each insert 26 corresponds with the arcuate recess 24 of each insert 18.

The insert 26 as shown in FIG. 4 of the drawings may be inserted in a corresponding notch 28 of a slat 12 in the direction of the arrow C and the incline of the buttress shaped barb 30 permits insertion of the insert 26 in the notch 28 during which time the relatively soft material of the insert 26 permits the buttress shaped barb 30 to become embedded therein for securely connecting the insert 26 with the respective slat 12.

When the assembly is made as shown in FIG. 1 of the drawings the slats 10 and 12 are universally pivoted relative to each other and these slats are connected together by reason of the fact that the inserts 18 and 26 are fixed to the slats 10 and 12, respectively, as hereinbefore described.

In the modification as shown in FIGS. 5, 6 and 7, substantially parallel spaced slats 34 are pivotally interconnected to angularly intersecting parallel spaced slats 36.

Universal bearing assemblies 38 are disposed at the intersections of the slats 34 and 36 pivotally to interconnect them at their intersection areas.

Each universal joint assembly 38 is provided with a spherical bearing member 40 and a pair of inserts 42 and 44 which are secured in notches 46 and 48 of the slats 34 and 36, respectively.

The slats 34 and 36 are substantially the same width as the inserts 42 and 44, respectively, and each notch 48 in each slat 36 is provided with buttress barbs 50 similar to the hereinbefore described barbs 30 in the insert 26 and additionally each slot 36 is provided with a projection 52 adapted to be embedded into the insert 44 when disposed therein.

Each insert 44 engages the spherical bearing member 40 for a distance substantially in excess of 180 degrees as indicated by the arrows D in FIG. 6 of the drawings. Likewise, each insert 42 engages each spherical bearing member 40 for a distance in excess of 180 degrees about its periphery as indicated by arrows E in FIG. 7 of the drawings.

It will be seen that the spherical engagement of the inserts 42 and 44 will prevent lateral displacement of the slats relative to each other due to the spherical engagement of these inserts with the spherical bearing member 40.

In the modification as shown in FIG. 8 of the drawings, slats 54 and 56 are provided with notches 58 and 60, respectively, in which inserts 62 and 64, respectively, are disposed. These inserts are similar to the hereinbefore described inserts 42 and 44 except that these inserts may be adhesively secured in the notches 58 and 60 by any suitable material as desired.

While the slats 34 and 36 as disclosed in FIGS. 6 and 7 are provided with notches it will be obvious to those skilled in the art that the outer edges of these slats may terminate at F and G, respectively, as shown in FIGS. 6 and 7 whereby substantially V-shaped notches in the slats may be eliminated if desired.

It will be obvious to those skilled in the art that various modifications of the present invention may be resorted to in a manner limited only by a just interpretation of the following claims.

I claim:

1. In a louver structure the combination of: a first slat; a second slat angularly intersecting said first slat; each of said slats provided with a notch located at the area of intersection with the other slat; a universal bearing assembly interconnecting said slats and comprising a spherical bearing member; first and second inserts secured in said notches of said first and second slats and pivotally connected to said spherical bearing member, said first inserts being substantially U-shaped and engageable with said spherical bearing member over substantially more than 180 degrees of its periphery; opposed portions of said U-shaped insert deflectable apart to receive said spherical bearing member, said notches being of a dimension to hold said opposed portions together around said periphery for substantially more than 180 degrees for retaining said bearing member in said U-shaped insert.

2. In a louver structure the combination of: a first slat; a second slat angularly intersecting said first slat; each of said slats provided with a notch located at the area of intersection with the other slat; a universal bearing assembly interconnecting said slats and comprising a spherical bearing member; first and second inserts secured in said notches of said first and second slats and pivotally connected to said spherical bearing member, said first inserts being substantially U-shaped and engageable with said spherical bearing member over substantially more than 180 degrees of its periphery; opposed portions of said U-shaped insert deflectable apart to receive said spherical bearing member, said notches being of a dimension to hold said opposed portions together around said periphery for substantially more than 180 degrees for retaining said bearing member in said U-shaped insert; means for retaining said inserts in said notches of said slats.

3. In a louver structure the combination of: a first slat; a second slat angularly intersecting said first slat; each of said slats provided with a notch located at the area of intersection with the other slats; a universal bearing assembly interconnecting said slats and comprising a universal bearing member; first and second inserts secured in said notches of said first and second slats and pivotally connected to said universal bearing member; means for retaining said inserts in said notches of said slats, said last mentioned means comprising structures of said slats projecting inwardly of said notches and embedded in said inserts thereby interconnecting said inserts with said slats at their notched portions.

4. In a louver structure the combination of: a first slat; a second slat angularly intersecting said first slat; each of said slats provided with a notch located at the area of intersection with the other slats; a universal bearing assembly interconnecting said slats and comprising a universal bearing member; first and second inserts secured in said notches of said first and second slats and pivotally connected to said universal bearing member; means for retaining said inserts in said notches of said slats, said last mentioned means comprising barb structures of said slats projecting inwardly of said notches and embedded in said inserts thereby interconnecting said inserts with said slats at their notched portions, said universal bearing member being spherical; and spherical portions of said inserts engaging said spherical member for a distance substantially in excess of 180 degrees.

5. In a louver structure the combination of: a first slat; a second slat angularly intersecting said first slat; each of said slats provided with a notch located at the area of intersection with the other slats; a universal bearing assembly interconnecting said slats and comprising a universal bearing member; first and second inserts secured in said notches of said first and second slats and pivotally connected to said universal bearing member; means for retaining said inserts in said notches of said slats, said last mentioned means comprising barb structures of said slats projecting inwardly of said notches and embedded in said inserts thereby interconnecting said inserts with said slats at their notched portions, said universal bearing member being spherical; and spherical portions of said inserts engaging said spherical member for a distance substantially in excess of 180 degrees, said inserts having substantially channel-shaped recess portions therein in which said slats are fitted about said notch portions therein.

6. In a louver structure the combination of: a universal joint assembly; a spherical bearing member for said universal joint assembly; a pair of slat inserts pivotally connected to said universal bearing member and angularly disposed relative to each other; first and second slats angularly intersecting each other and having notches therein disposed at said intersections; and means for holding said slat inserts engaged and secured in said notches of said slats at their intersections whereby said slats are universally pivotally connected together by said universal joint assembly, said first inserts being substantially U-shaped and engageable with said bearing member over substantially more than 180 degrees of its periphery; opposed portions of said U-shaped insert deflectable apart to receive said bearing member; said notches being of a dimensions, to hold said opposed portions together around said periphery for substantially more than 180 degrees for retaining said bearing member in said U-shaped insert.

References Cited in the file of this patent

UNITED STATES PATENTS

| | | |
|---|---|---|
| 2,646,741 | Castle | July 28, 1953 |
| 2,681,259 | White | June 15, 1954 |
| 2,892,395 | Goettl | June 30, 1959 |